Oct. 14, 1969  J. G. BURNS  3,471,900
MOLD FOR ENCAPSULATING ELECTRICAL COMPONENTS
Filed May 24, 1967  2 Sheets-Sheet 1
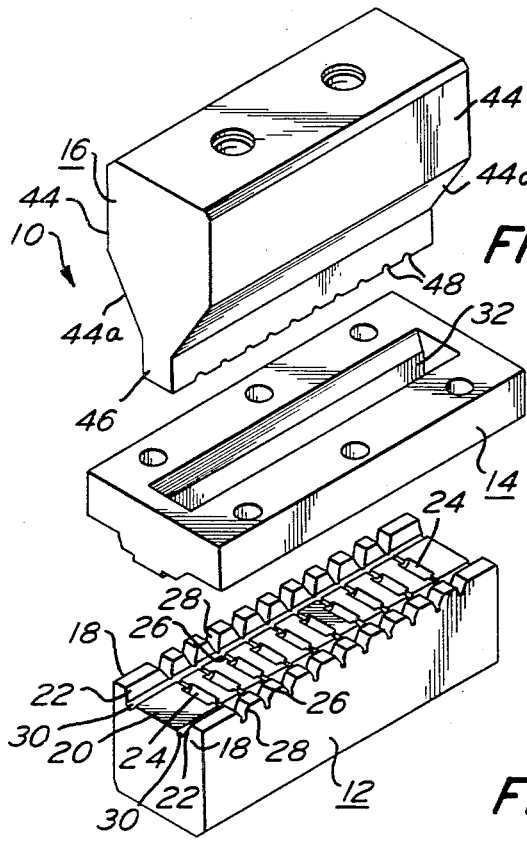
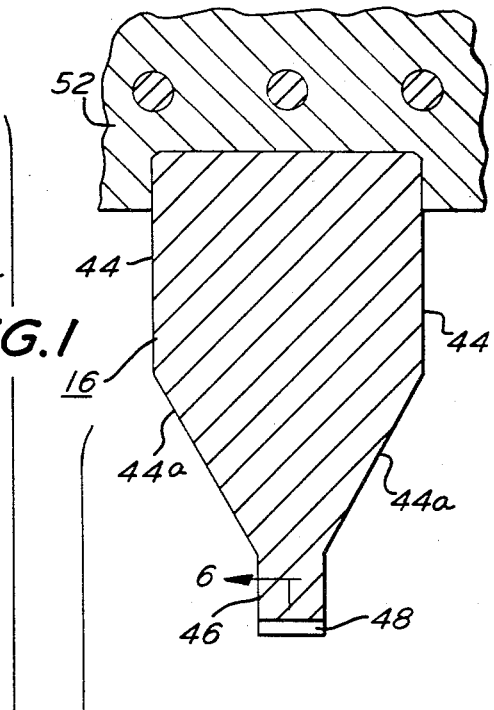
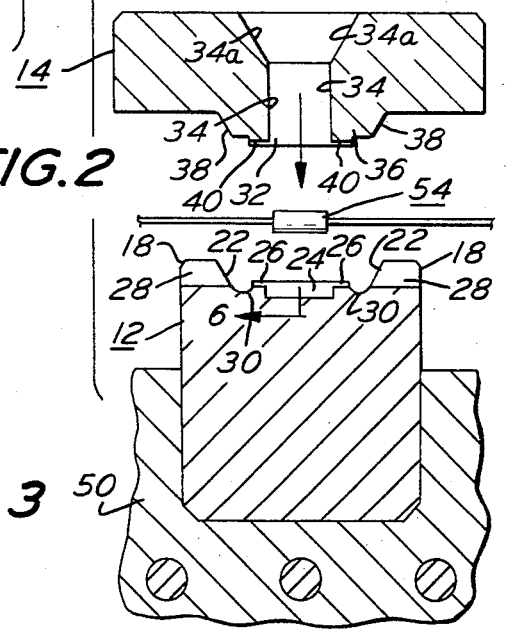
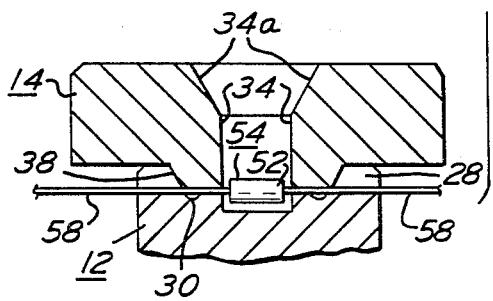
INVENTOR
JEROME G. BURNS
BY
ATTORNEY

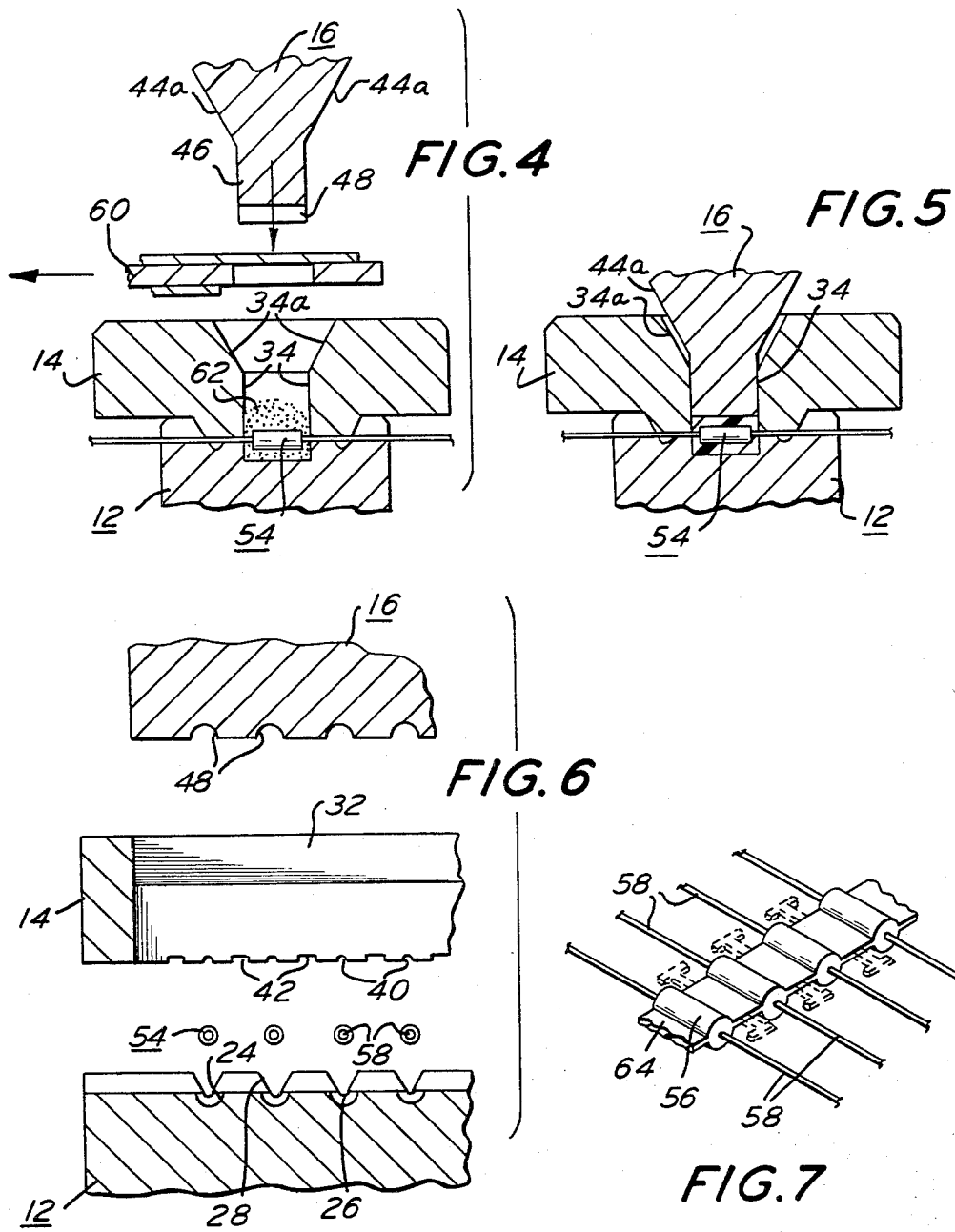

United States Patent Office 3,471,900
Patented Oct. 14, 1969

3,471,900
MOLD FOR ENCAPSULATING ELECTRICAL
COMPONENTS
Jerome G. Burns, Collingswood, N.J., assignor to
TRW Inc., a corporation of Ohio
Filed May 24, 1967, Ser. No. 640,995
Int. Cl. B29c 3/00
U.S. Cl. 18—36                                      6 Claims

ABSTRACT OF THE DISCLOSURE

A mold for encapsulating electrical components in a plastic jacket by compression molding without forming any flash around the terminal wires of the components. The mold is a three-sectional mold having a bottom section, a middle section and a top section. The bottom section has a plurality of semicylindrical mold cavities in its top surface which are adapted to receive the body of the electrical components, and shallow grooves extending from the ends of the mold cavities which receive the terminal wires of the components. The middle section fits snugly on the bottom section and has a rectangular opening therethrough of the same width and length as that of the mold cavities array in the bottom section so that the side walls of the opening form an extension of the end walls of the mold cavities. The middle section also has shallow grooves in its bottom surface extending from the sides of opening. The shallow grooves mate with the shallow grooves in the bottom section so that the mating shallow grooves form a seal around the terminal wires that fit in the grooves. The top section has a plunger portion which slidingly fits snugly in the rectangular opening in the middle section. The plunger has a plurality of semicylindrical mold cavities in its bottom surface which mate with the corresponding mold cavities in the bottom section when the plunger is inserted in the rectangular opening in the middle section.

Background

Many types of electrical components, such as resistors, capacitors, diodes, etc., are encapsulated in a protective jacket of an electrically insulating plastic with the terminal wires of the component projecting from the protective jacket. The easiest and least expensive manner of encapsulating such components on a mass production basis is to compression mold the plastic jacket around the components. To encapsulate the electrical components by compression molding, it has been the practice to use a two-section mold with the mating surfaces of each of the mold sections having symmetrical cavities which receive the electrical components to be encapsulated. In the encapsulation of the components in such a two-section mold, the excess plastic molding material extrudes or flashes at the "split line" between the mating surfaces of the mold sections. This provides a flash completely around each of the encapsulated components, including a portion of the terminal wires, which must be removed. Although the flash is thin and brittle, it has been found to be difficult to completely remove the flash from around the terminal wires right up to the encapsulated jacket. Since the complete removal of the flash from around the terminal wires of the electrical components is a specified requirement by many of the electrical components, it would be desirable to be able to encapsulate the components by compression molding without getting any of the flash on the terminal wires of the components.

Summary

It is an object of the present invention to provide a novel mold for encapsulating electrical components by compression molding.

It is another object of the present invention to provide a mold for encapsulating electrical components by compression molding with the terminal wires of the components being free from any flash.

It is a further object of the present invention to provide a mold for encapsulating electrical components by compression molding which shields the terminal wires of the components to prevent the formation of flash around the terminal wires.

Other objects will appear hereinafter.

Brief description of drawings

For the purpose of illustrating the invention, there is shown in the drawings a form which is presently preferred; it being understood, however, that this invention is not limited to the precise arrangements and instrumentalities shown.

FIGURE 1 is an exploded perspective view of the mold of the present invention.

FIGURE 2 is a transverse, sectional view of the mold of the present invention in its initial position for encapsulating electrical components.

FIGURE 3 is a transverse sectional view of the mold of the present invention in its rest position for encapsulating electrical components.

FIGURE 4 is a view similar to FIGURE 3 but showing the mold being filled with the plastic molding material.

FIGURE 5 is a transverse sectional view of the mold in its molding position.

FIGURE 6 is a sectional view taken along line 6—6 of FIGURE 2.

FIGURE 7 is a perspective view of a plurality of the encapsulated electrical components as they are taken from the mold.

Description of the invention

Referring initially to FIGURE 1 of the drawings, the mold of the present invention is generally designated as 10. Mold 10 comprises three sections, 12, 14 and 16. The bottom section 12 is the bottom cavity section. The middle section 14 is the side wall and shield section. The top section 16 is the top cavity and force section.

The bottom section 12 is a rectangular having a length greater than its other two dimensions. A pair of flanges 18—18 extend upwardly from the top surface 20 of the bottom section and extend completely along the side edges of the bottom section. As more clearly shown in FIGURE 2, the inner surface 22 of the flanges 18 taper toward each other from their top ends to the top surface 20 of the bottom section 12. A plurality of spaced, parallel, semicylindrical mold cavities 24 are provided in the top surface of the bottom section 12. The mold cavities 24 are arranged in alignment with the longitudinal axis of each cavity extending between the flanges 18. The dimensions of the cavities are equal to the final desired dimensions of the encapsulated component. At each end of each of the mold cavities 24, the top surface 20 of the bottom section 12 has a shallow groove 26 extending from the end of the mold cavity to the adjacent flange 18. The grooves 26 at the ends of each of the mold cavities 24 are in longitudinal alignment and are dimensioned to receive the terminal wires of the electrical components to be encapsulated. Each of the flanges 18 has a plurality of spaced, sustantially V-shaped notches 28 therein with each of the notches 28 being located at the end of a separate one of the grooves 26. The apex of each of the notches 28 extends to the bottom of the adjacent groove 26 and is shaped to correspond with the shape of the groove. A pair of overflow recesses 30 are provided in the top surface 20 of the bottom section 12 which extends longitudinally along the top surface at the inner surfaces 22 of the flanges 18.

The middle section 14 comprises a relatively thick, rectangular plate having a length equal to the length of the bottom section 12 and a width at least as wide as, but preferably slightly wider than, the width of the bottom section. A rectangular opening 32 is provided through the center of the middle section 14. The opening 32 is of a width equal to the length of the mold cavities 24 in the bottom section and of a length slightly shorter than the length of the middle section. The top portion 34a of the side walls 34 of the openings 32 tapers away from each other from a point within the opening of the top surface of the middle section. A rib 36 extends downwardly from the bottom surface of the middle section 14 and extends longitudinally along the center of the bottom surface for the full length of the middle section. The side walls 38 of the rib 36 taper toward each other from the bottom surface of the middle section to the bottom of the rib. The width and depth of the rib 36 and the angle of taper of the side walls 38 correspond to the distance between the flanges 18 of the bottom section 12, the height of the flanges, and the angle of the taper of the inner walls 22 of the flanges respectively. Thus, the rib 36 is adapted to fit snugly on the top surface 20 of the bottom section 12 between the flanges 18. A plurality of shallow grooves 40 are provided in and extend transversely across the bottom surface of the rib 36. The grooves 40 are of the same shape and size as and are positioned to mate with the shallow grooves 26 in the top surface of the bottom section 12. As shown in FIGURE 6, the bottom surface of the rib 36 is also provided with a plurality of overflow recesses 42 extending transversely thereacross between the shallow grooves 40.

The top section 16 is substantially rectangular and of a length equal to the length of the opening 32 in the middle section 14. The bottom portion 44a of the side walls 44 of the top section 16 taper toward each other to a downwardly extending, rectangular plunger 46 which extends longitudinally along the full length of the top section. The plunger 46 is of a width equal to the width of the opening 32 in the middle section 14, and of a depth substantially equal to the depth of the straight portion of the opening 23. The angle of taper of the bottom portion 44a of the side wall 44 corresponds to the angle of taper of the top portion 34a of the side walls 34 of the opening 32 in the middle section 14. A plurality of spaced, parallel, semicylindrical mold cavities 48 are provided in and extend transversely across the bottom surface of the plunger 46. The mold cavities 48 are the same size as and are positioned to mate with the mold cavities 24 in the bottom section 12.

In the use of the mold 10, the bottom section 12 is secured to the heated bottom plates 50 of a mold press, the top section 16 is secured to the heated top plates 52 of the press, and the middle section is mounted on the press between the top and bottom section. The mold press may be of the type wherein the bottom section 12 is held stationary and the middle section 14 and the top section 16 are movable toward and away from the bottom section, or of the type wherein the middle section is held stationary and the top and bottom sections are movable toward and away from the middle section.

To encapsulate electrical component, generally designated as 54 in FIGURE 2, in the mold 10, the bottom section 12 and top section 16 are heated to their proper molding temperature through the platens 50 and 52. With the mold sections 12, 14 and 16 being separated, as shown in FIGURE 2, the electrical components 54 are seated on the bottom section 12 with the body portion 56 of each of the components fitting into a mold cavity 24 and the terminal wires 58 fitting in and extending along the grooves 26 and the bottom of the notches 28. With the electrical components 54 so seated on the bottom section 12, the bottom section 12 and middle section 14 are brought together until the rib 36 on the middle section is seated on the top surface 20 of the bottom section and snugly between the flanges 18 as shown in FIGURE 3. When the bottom section 12 and middle section 14 are brought together, the terminal wires 58 of the electrical components 54, which are seated in the shallow grooves 26 in the top surface of the bottom section, also fit into the shallow grooves 40 in the bottom surface of the rib 36 on the middle section 14. The shallow grooves 26 and 40 are of a size and shape that they completely surround the terminal wires 58 and form a tight seal with the terminal wires at the junction of the side walls 34 of the opening 32 in the middle section and the end surfaces of the mold cavities 24.

The mold is then charged with the proper amount of the plastic molding material which is in powdered form. As shown in FIGURE 4, this can be achieved by a molding material loader 60 which is inserted between the middle section 14 and the top section 16 and discharges a metered quantity of the molding material 62 into the opening 32 in the middle section. The molding material loader 60 is then withdrawn from between the middle section 14 and the top section 16.

The top section 16 is then lowered so that the plunger 46 extends into the opening 32 in the middle section 14 as shown in FIGURE 5. As the plunger 46 moves downwardly in the opening 32, it compresses the molding material into the mold cavities 24 in the bottom section 12 and the mold cavities 48 in the plunger. Since each pair of mating mold cavities 24 and 48 surrounds the body 56 of an electrical component 54, the molding material is compressed around the body of the component as shown in FIGURE 5. The heated bottom section 12 and top section 16 heats the compressed molding material until the material melts and then cures. When the molding material melts, the top section 16 can be forced downwardly until the bottom surface of the plunger 46 almost engages the top surface 20 of the bottom section 12. In order to ensure complete encapsulation of the electrical components 54, it is necessary that the charge of the molding material contain a slight excess of the material. When the molding material melts under pressure, the excess material is forced out of the mating, molding cavities and flows between the bottom surface of the plunger 46 and the top surface 20 of the bottom section 12 to and through the overflow recesses 42 in the bottom surface of the rib 36 to the middle section 14. Depending on the amount of excess material in the charge, the excess material may flow to the overflow recesses 30 in the top surface 20 of the bottom section 12. However, since the bottom section 12 and middle section 14 are sealed around the terminal wires 58 of the electrical components 54, none of the molding material will flow along the terminal wires beyond the ends of the mold cavities.

When the molding material is cured, the mold sections 12, 14 and 16 are separated leaving the encapsulated electrical components 54 seated on the bottom section 12. FIGURE 7 shows the electrical components as they are taken from the mold 10. The body 56 of each of the electrical components 54 is encased in a plastic jacket and a thin web 64 of the plastic material, the thickness of which is exaggerated in FIGURE 9, extends between and connects the encapsulated body portions of the components. Depending on the amount of excess molding material used in the charge, narrow arms of the plastic material may extend from the sides of the webs 64 where the excess material flowed into the overflow recesses 42 in the middle section 14. However, since the terminal wires 58 were sealed between the bottom section 12 and the middle section 14, the terminal wires are free from any flash right up to the encapsulated body. The electrical components can be easily separated by breaking the thin webs 64 and removing the flash up to the circumference of the encapsulated bodies.

The present invention may be embodied in other specific forms without departing from the spirit or essential attributes thereof, and accordingly, reference should be made to the appended claims, rather than to the foregoing specification as indicating the scope of the invention.

I claim:
1. A mold for encapsulating electrical components in a plastic jacket by compression molding comprising:
   a bottom section having a semicylindrical mold cavity in its upper surface, said mold cavity being adapted to receive the body of an electrical component with the terminal wires of the component extending over the upper surface of the bottom section beyond the ends of the mold cavity,
   a middle section adapted to seat snugly on the upper surfaces of the bottom section and having a rectangular opening therethrough between the upper end bottom surface of the middle section, the width of said opening being equal to the length of said mold cavity in the bottom section and the side walls of said opening being in vertical alignment with the ends of said mold cavity,
   the mating bottom surface of the middle section and upper surfaces of the bottom section being shaped to provide a seal completely around the terminal wires of the electrical components at the junction of the side walls of the opening in the middle section and the ends of the mold cavity, and
   a top section having a rectangular plunger adapted to fit snugly within the opening in the middle section, said plunger having a semi-cylindrical mold cavity in its bottom surface which mates with the mold cavity in the bottom section.

2. A mold in accordance with claim 1 in which the upper surface of the bottom section has a shallow groove extending longitudinally from each end of the mold cavity and the bottom surface of the middle section has a shallow groove extending from each side of the opening in the middle section and which mates with the shallow grooves in the bottom section, said mating shallow grooves being shaped to receive the terminal wires of the electrical component and form the seal around the terminal wires.

3. A mold in accordance with claim 1 in which the bottom section has a plurality of spaced, parallel, semicylindrical mold cavities in its upper surface, the opening through the middle section is of a length to expose all of the bottom section mold cavities therethrough, and the plunger of the top section has a plurality of spaced, semicylindrical mold cavities therein, each of which mates with a separate one of the bottom section mold cavities.

4. A mold in accordance with claim 3 in which the upper surface of the bottom section has a separate shallow groove extending longitudinally from each end of each of the mold cavities and the bottom surface of the middle section has a plurality of shallow grooves extending from each side of the opening through the middle section, each of the shallow grooves in the middle section mating with a separate one of the shallow grooves being shaped to receive the terminal wire of an electrical component and form the said seal around the terminal wire.

5. A mold in accordance with claim 4 in which the bottom surface of the middle section has a plurality of overflow grooves extending from the sides of the opening through the middle section, said overflow grooves alternating with the shallow grooves along the bottom surface of the middle section.

6. A mold in accordance with claim 5 in which the bottom section has a pair of spaced, parallel flanges extending upwardly from the upper surface thereof, said flanges being at, but spaced from, opposite ends of the mold cavities and extending perpendicularly to the longitudinal axes of the mold cavities, the shallow grooves in the upper surface of the bottom section extends to the flanges and each of the flanges has a plurality of substantially V-shaped notches therein with each of said notches being at the end of a separate one of said shallow grooves and the apex of the notches extending to the bottom of the shallow grooves.

References Cited
UNITED STATES PATENTS

| | | | |
|---|---|---|---|
| 2,176,604 | 10/1939 | Benkelman. | |
| 2,276,380 | 3/1942 | English et al. | 18—36 |
| 2,582,022 | 1/1952 | Feldman et al. | 18—36 |
| 2,658,238 | 1/1953 | Rizzo | 18—36 X |
| 3,108,328 | 10/1963 | Kelleher | 18—36 |
| 3,142,716 | 7/1964 | Gardener | 249—95 X |
| 3,149,375 | 9/1964 | Gehl | 18—36 X |
| 3,189,947 | 6/1965 | Pettkoske | 18—36 |
| 3,221,089 | 11/1965 | Cotton | 18—36 X |
| 3,257,709 | 6/1966 | Terman et al. | 18—36 X |
| 3,345,692 | 10/1967 | Cobaugh et al. | 18—36 |
| 3,391,426 | 7/1968 | Hugill | 18—36 |

J. HOWARD FLINT, JR., Primary Examiner

U.S. Cl. X.R.

249—95